US006683390B2

(12) United States Patent
Miura

(10) Patent No.: US 6,683,390 B2
(45) Date of Patent: Jan. 27, 2004

(54) ON-VEHICLE ELECTRONIC DEVICE AND PANEL ROTATION CONTROL METHOD

(75) Inventor: Makoto Miura, Tokorozawa (JP)

(73) Assignee: Kabushiki Kaisha Kenwood, Tokyo (JP)

(*) Notice: Subject to any disclaimer, the term of this patent is extended or adjusted under 35 U.S.C. 154(b) by 153 days.

(21) Appl. No.: 09/914,724

(22) PCT Filed: Jan. 16, 2001

(86) PCT No.: PCT/JP01/00230
§ 371 (c)(1),
(2), (4) Date: Sep. 4, 2001

(87) PCT Pub. No.: WO01/54130
PCT Pub. Date: Jul. 26, 2001

(65) Prior Publication Data
US 2002/0135231 A1 Sep. 26, 2002

(30) Foreign Application Priority Data
Jan. 17, 2000 (JP) ......................................... 2000-008060

(51) Int. Cl.$^7$ ................................................. B60R 25/00
(52) U.S. Cl. ...................... 307/10.2; 307/9.1; 307/10.1; 74/89.18
(58) Field of Search ................................. 307/10.2, 9.1, 307/10.1; 74/89.18

(56) References Cited
U.S. PATENT DOCUMENTS 5,102,181 A * 4/1992 Pinkney .................. 296/37.12
5,705,975 A * 1/1998 Serino et al. ................ 340/426
6,474,431 B1 * 11/2002 Baker et al. ................... 180/90

FOREIGN PATENT DOCUMENTS

| JP | 09-215766 | * | 8/1997 |
| JP | 10-114247 | * | 5/1998 |
| JP | 11-213647 | * | 8/1999 |

* cited by examiner

Primary Examiner—Brian Sircus
Assistant Examiner—Robert L DeBeradinis
(74) Attorney, Agent, or Firm—Eric J. Robinson; Robinson Intellectual Property Law Office, P.C.

(57) ABSTRACT

An electronic equipment for vehicle use which can be properly protected from theft is provided. When an eject key is pressed down, a process controller operates a panel drive part to rotate an operation panel into the horizontal position (step S12). When the process controller determines that no CD is housed (step S13), it determines whether the removal of the operation panel has been detected (step S16). When the removal of the operation panel has been detected, the process controller rotates panel holder into the front-face position (step S17). When the process controller determines at step S13 that any CD has been housed, it ejects the housed CD and starts a timekeeping operation (step S18). When the process controller determines that a predetermined time has elapsed (step S21), it rotates the panel holder into the back-face position (step S22).

10 Claims, 14 Drawing Sheets

(a)

(b)

(a)

(b)

(a)

(b)

ON-VEHICLE ELECTRONIC DEVICE AND PANEL ROTATION CONTROL METHOD

TECHNICAL FIELD

The present invention relates to an electronic equipment for vehicle use which has a rotatable operation panel provided on the front, and more particularly, to an electronic equipment for vehicle use which can be properly protected from theft and a panel rotation control method.

BACKGROUND ART

Conventional electronic equipments for vehicle use have incorporated various antitheft ideas.

For example, a panel-detachable electronic equipment for vehicle use which has a detachable operation panel provided on the front (a panel-detachable equipment) may be named as a typical one. In order for the panel-detachable equipment to be protected from theft, the user must detach the operation panel before leaving the vehicle for a long time so as to make the equipment unavailable and incomplete. Such a panel-detachable equipment technology is disclosed in the Japanese Patent Application Laid-Open No. 6-252565.

The panel-detachable equipment disclosed in the Japanese Patent Application Laid-Open No. 6-252565 has an operation panel 102 provided on the front of an equipment body 101 and the operation panel 102 can be detached in the forward direction and reattached in position, as shown in FIG. 14. More specifically, in the panel-detachable equipment shown in FIG. 14, the operation panel 102 is detachably held onto the equipment body 101 through a protrusion 104 and a hook 105. When the user releases the hook 105 and the protrusion 104, the operation panel 102 is detached.

When the operation panel 102 is detached, the equipment is made unavailable and incomplete. Thus, the equipment may hardly be a target for thieves, so that it can be protected from theft effectively.

A maskable electronic equipment for vehicle use which has a rotatable operation panel provided on the front to turn the back face toward the front for antitheft (a maskable equipment) is also well known as another typical one. In order for the maskable equipment to be protected from theft, the operation panel can be rotated to turn the back face toward the front (to mask the operation panel) so that it may appear that there exists no equipment. Such a maskable equipment technology is disclosed in the Japanese Patent Application Laid-Open No.9-123842.

In the maskable equipment disclosed in the Japanese Patent Application Laid-Open No. 9-123842, an operation panel 202 provided on the front is rotated in sequence as shown in FIGS. 15(a) to 15(c) by a predetermined drive mechanism provided on an equipment body 201 and the operation panel 202 is finally stopped with the back face turned toward the front as shown in FIG. 15(d).

In other words, since the back face of the operation panel 202 is turned toward the front when the maskable equipment shown in FIG. 15 is housed in position in a vehicle, it may appear to thieves that there exists no equipment in the vehicle, so that it can be protected from theft effectively.

Although the panel-detachable equipment described above and shown in FIG. 14 can be protected from theft effectively by physically detaching the operation panel, it must have an opening 103 used to insert/eject a recording medium such as a compact disk (CD) and thus, an effective area for operational keys provided on the operation panel 102 may be reduced.

In addition, since it may be undesirable in some situation to keep the operation panel 102 detached, the panel-detachable equipment cannot be always protected from theft effectively.

On the other hand, the maskable equipment described above and shown in FIG. 15 requires the opening 203 to be provided only on the equipment body 201 in order to insert/eject the recording medium but requires no opening on the operation panel 202, because the operation panel 202 on the front is rotatable. Thus, an effective area for operational keys provided on the operation panel 202 may be advantageously increased.

However, the maskable equipment as shown in FIG. 15 may not be protected from theft effectively. For example, in a region where the maskable equipment is well known, thieves can expect that such an equipment is installed on a vehicle even when the back face of the operation panel 202 is turned toward the front to mask the equipment. In such a situation, the equipment cannot be protected from theft effectively.

As described above, the panel-detachable equipment and the maskable equipment may not be protected from theft effectively by themselves.

The present invention has been made in view of the facts described above and it is an object of the present invention to provide an electronic equipment for vehicle use which can be properly protected from theft and a panel rotation control method.

DISCLOSURE OF THE INVENTION

To attain the above-mentioned object, an electronic equipment for vehicle use according to the present invention has an operation panel provided on the front, which operation panel can be rotated into a first state (front-face position) where the operation side of the operation panel is turned toward a user and into a second state (back-face position) where the back face of the operation side is turned toward the user, and the equipment includes a holder for detachably holding the operation panel, a drive mechanism for driving the holder to rotate into the front-face position and the back-face position, an engagement mechanism for engagingly supporting the holder and the operation panel, and a release key for releasing the engagement performed by the engagement mechanism.

According to the present invention, the operation panel engagingly supported by the holder can be removed from the holder by operating the release key and then the electronic equipment for vehicle use is made unavailable and incomplete. Thus, the equipment may hardly be a target for thieves, so that it can be protected from theft effectively.

In the electronic equipment for vehicle use according to the present invention, a sensor is also provided to detect that the operation panel is removed from the holder, so that the holder can be automatically rotated into a predetermined position in response to the detection of the fact that the operation panel is removed.

The sensor is composed of, for example, a contact sensor to detect that the operation panel is removed from the holder. When the sensor detects that the operation panel is removed, a controller controls the drive mechanism to rotate the holder into the front-face position. Thus, the equipment can be protected from theft effectively.

In addition, the operation panel can be removed in a particular position other than the front-face and back-face positions and when the removal is detected, the holder can be rotated into the front-face position and then the operation panel can be attached again while the holder is in the front-face position.

In the electronic equipment for vehicle use, the engagement mechanism has such a structure that a first engagement member provided for the operation panel and a second engagement member provided for the holder are forced with springs to fit the operation panel into a predetermined position in the holder and then the operation panel can be removed from the predetermined position in the holder through the release key. More specifically, the engaging structure is such that (i) the operation panel is pressed against the predetermined position in the holder in the direction perpendicular to the operation side for engagement or (ii) the operation panel is engagingly supported by the holder while it is kept slidable in the direction parallel to the operation side. The latter engaging structure includes a first engaging structure for regulating the relative movement between the operation panel and the holder with a first part and a second engaging structure for regulating it so that the engagement can be released with the release key.

Preferably, the release key is provided on the operation panel and is composed of a slide key which can be moved in the direction crossing a groove provided in the panel for engaging with a protrusion formed on the holder.

According to another aspect, the present invention can be construed as a panel rotation control method for an electronic equipment for vehicle use. According to the panel rotation control method of the present invention, in an electronic equipment for vehicle use having an operation panel provided on the front, which operation panel can be rotated into a front-face position where the operation side of the operation panel is turned toward a user and into a back-face position where the back face of the operation side is turned toward the user, a control method for a drive mechanism which drives a holder for detachably holding the operation panel to rotate into the front-face position and the back-face position is provided and the method includes a step of operating the drive mechanism to rotate the holder into a predetermined position where the operation panel can be removed, a step of detecting that the operation panel is removed from the holder, and a step of driving the holder into the front-face position in response to the detection.

According to the inventive method, the rotation step operates the drive mechanism to rotate the holder provided on the front into the predetermined position and the detection step detects that the operation panel is removed from the holder. When the detection step detects that the operation panel is removed, the drive mechanism is operated to rotate the holder into the front-face position. Then, the electronic equipment for vehicle use is made unavailable and incomplete. Thus, the equipment may hardly be a target for thieves, so that it can be protected from theft effectively.

Alternatively, while the operation panel is not removed, the drive mechanism may be operated in response to predetermined conditions to rotate the holder as well as the operation panel into the back-face position. In this case, since the control step stops the holder holding the operation panel with the back face turned toward the front, it may appear to thieves that there exists no such an equipment in a vehicle, so that it can be protected from theft effectively.

BEST MODE FOR CARRYING OUT THE INVENTION

An electronic equipment for vehicle use according to an embodiment of the present invention will be described below with reference to the attached drawings.

Figure 1:
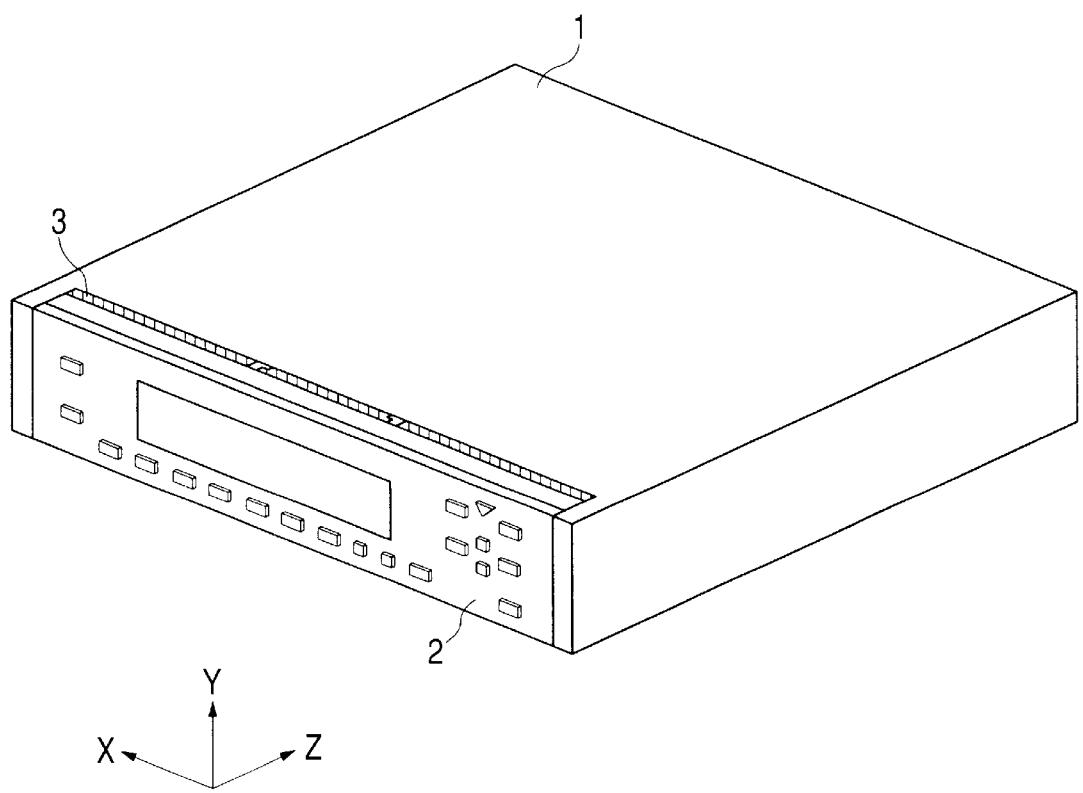
FIG. 1 is a perspective view for showing the appearance of an electronic equipment for vehicle use according to an embodiment of the present invention.

FIG. 1 is a perspective view for showing the appearance of an electronic equipment for vehicle use which is applicable to the embodiment of the present invention. The electronic equipment for vehicle use shown in FIG. 1 is an equipment which can play back a recording medium such as a compact disk (CD) and includes an equipment chassis 1, an operation panel 2, and a panel holder 3.

Figure 2:
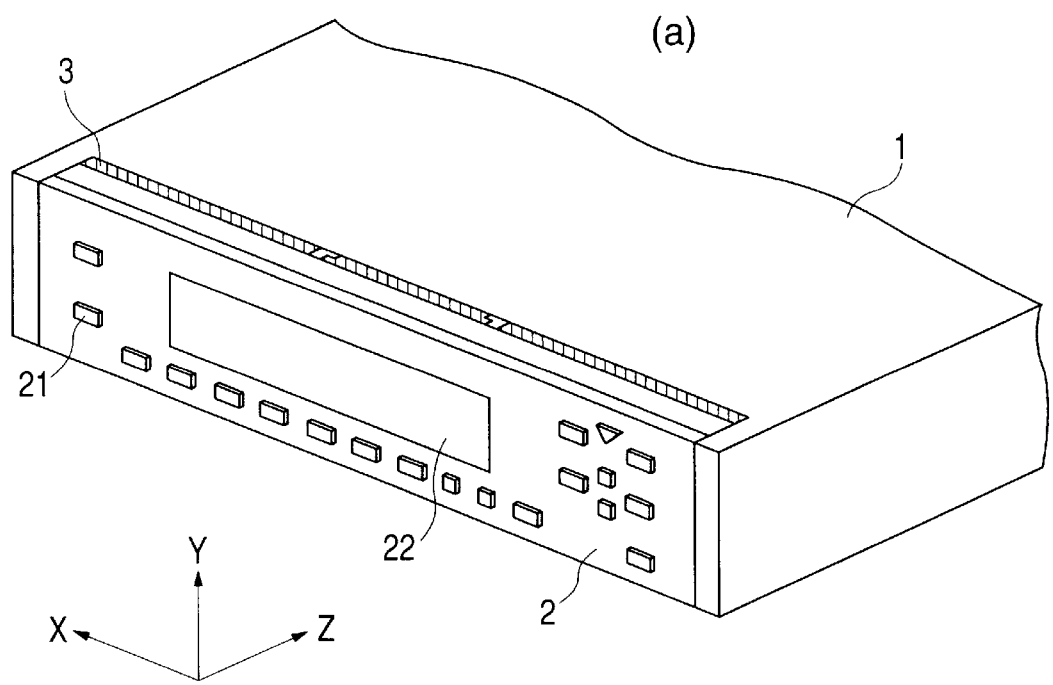
FIG. 2(a) is an outline drawing for showing the operation panel in the front-face position and FIG. 2(b) is a sectional view for explaining the arrangement of the drive mechanism.
Figure 2:
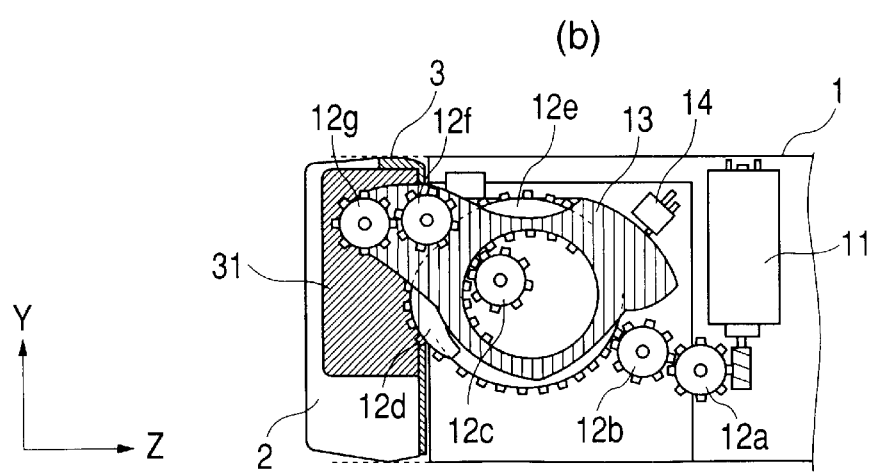
Figure 3:
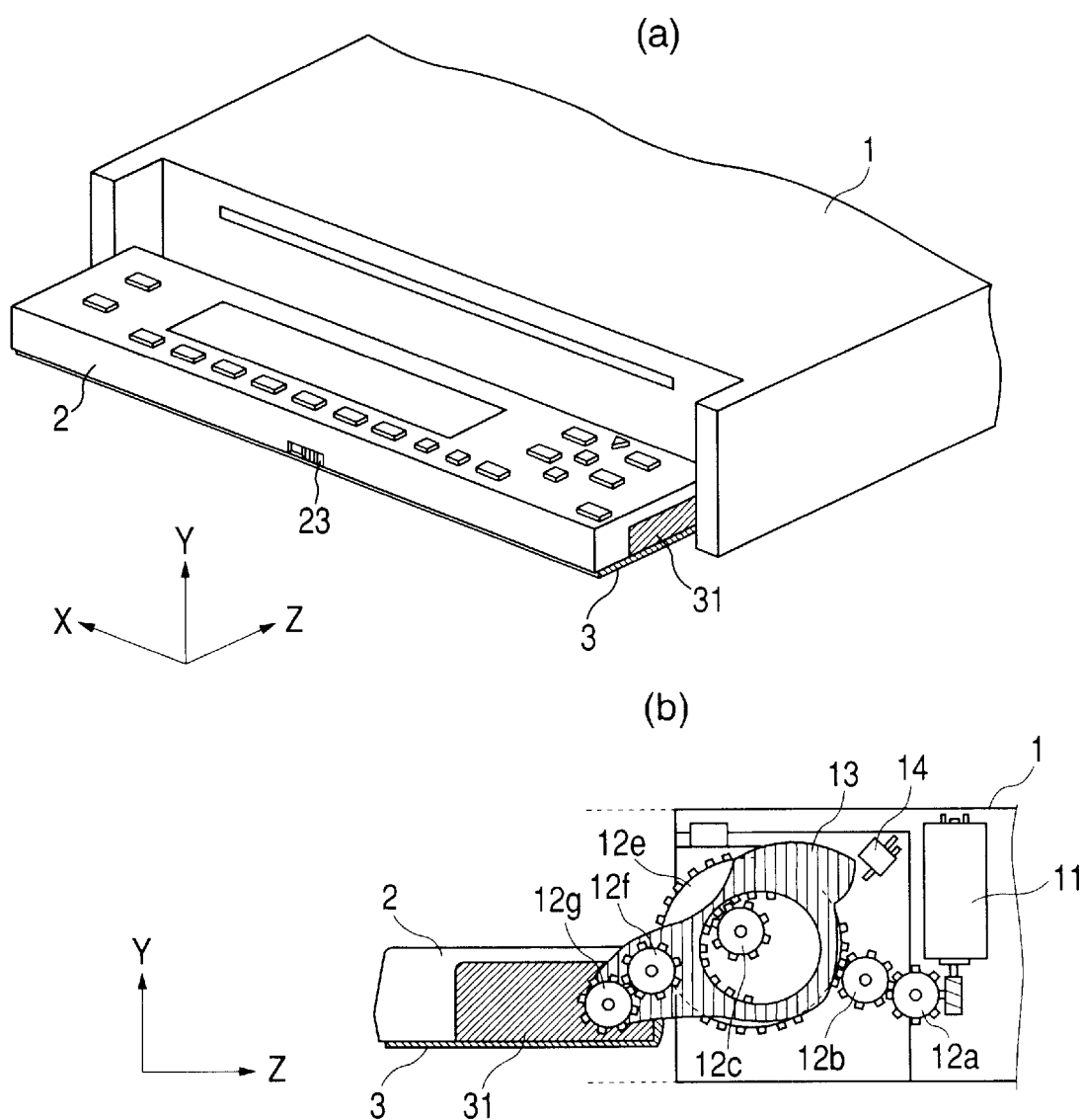
FIG. 3(a) is an outline drawing for showing the operation panel in the horizontal position and FIG. 3(b) is a sectional view for explaining the arrangement of the drive mechanism.
Figure 4:
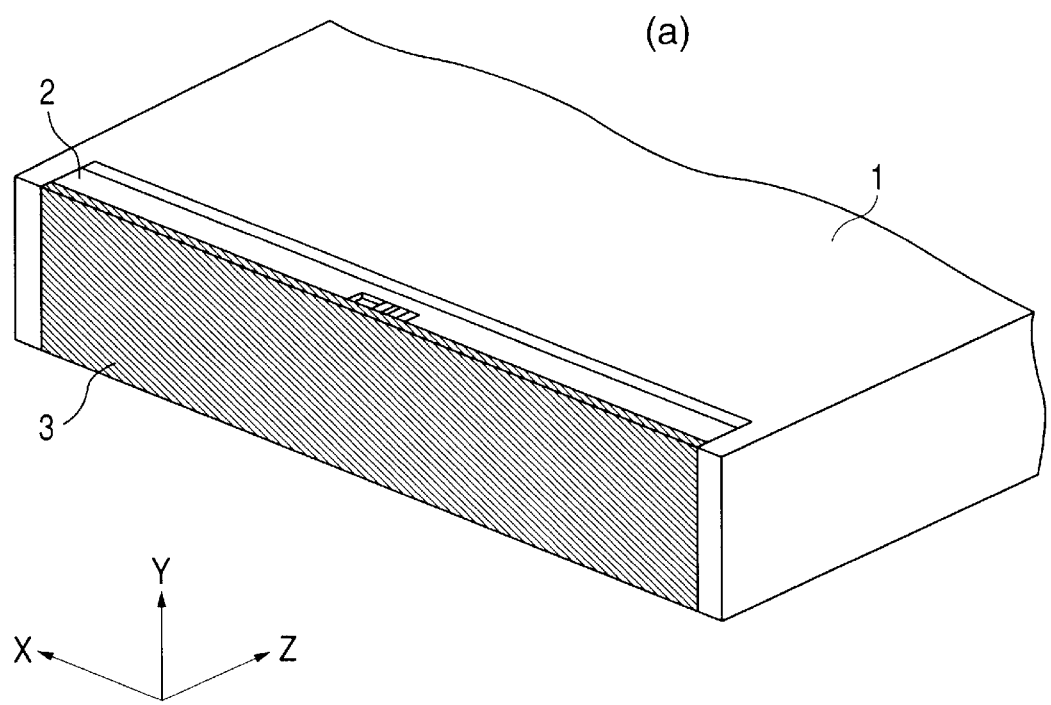
FIG. 4(a) is an outline drawing for showing the operation panel in the back-face position and FIG. 4(b) is a sectional view for explaining the arrangement of the drive mechanism.
Figure 4:
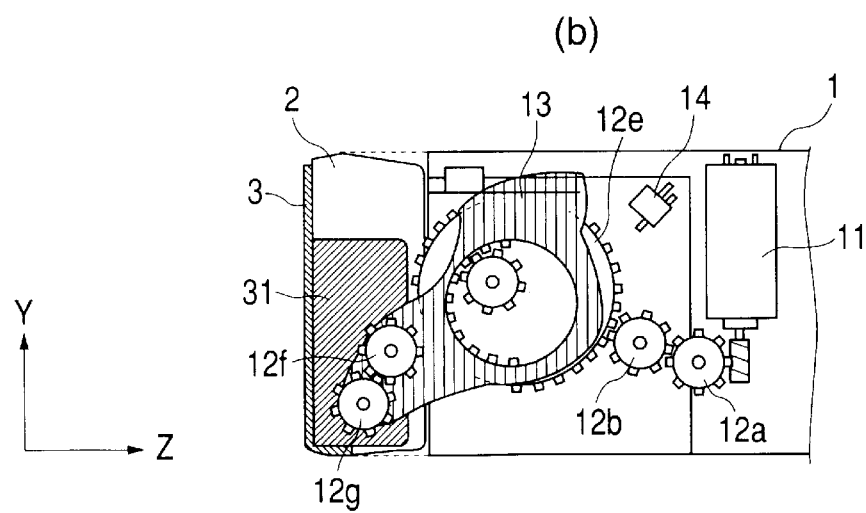

The equipment chassis 1 includes a drive mechanism to rotate the operation panel 2 provided on the front. The drive mechanism will be described below with reference to FIGS. 2 to 4. FIG. 2(a), FIG. 3(a), and FIG. 4(a) are outline drawings for explaining three positions into which the operation panel 2 is rotated by the drive mechanism, respectively. FIG. 2(b), FIG. 3(b), and FIG. 4(b) are sectional views on the YZ plane for showing the relationship between the drive mechanism and the operation panel 2 in the respective positions.

As shown in FIG. 2(b), the drive mechanism includes a motor 11, gears 12a to 12g, an arm plate 13, and a microswitch 14.

The motor 11 rotates in the forward direction or the reverse direction to apply a driving force to the gear 12a through a worm fixed on the rotation axis.

The gears 12a to 12g are rotated in a predetermined direction according to the rotation direction of the motor 11 to change the placement (orientation) of the arm plate 13. The gears 12f, 12g are pivotally supported on the arm plate 13 to change their positions along with the arm plate 13. In addition, the support axis for the gear 12g is fixed to a side plate 31 of the panel holder 3 described later.

The arm plate 13 is a plate with an internal gear and moves along a groove in a predetermined cam plate through the rotation of the gear 12c. Then the arm plate 13 changes its placement (orientation) so that the pivotally supported gears 12f, 12g can make a predetermined track.

The microswitch 14 has a switch element and is fixed in the proximity to the arm plate 13. The microswitch 14 determines whether the switch element is in contact with the arm plate 13 to detect the placement of the arm plate 13.

Thus configured drive mechanism can allow the arm plate 13 to change its placement as shown in FIG. 2(b), FIG. 3(b), and FIG. 4(b) and to move the gears 12f, 12g accordingly. As the gear 12g rotates, the side plate 31 of the panel holder 3 rotates so that the operation panel 2 can be rotated into three positions as shown in FIG. 2(a), FIG. 3(a), and FIG. 4(a).

In other words, the drive mechanism on the equipment chassis 1 drives the operation panel 2 to rotate from the front-face position as shown in FIG. 2(a) (that is, an operational key 21 and a display unit 22 on the operation panel 2 are turned toward the front), to the horizontal position as shown in FIG. 3(a) (that is, a slide key 23 on the operation panel 2 is turned toward the front), and finally to the back-face position as shown in FIG. 4(a) (that is, the back face of the panel holder 3 is turned toward the front).

The drive mechanism described above is provided on each side of the equipment chassis 1 (the motor 11 is provided on one of the sides only) as shown in FIG. 5(a) to drive both sides equally through a shaft 16 which transmits a driving force. FIG. 5(a) is a sectional view on the XZ plane for showing the panel holder 3 in the horizontal position.

Next, the panel holder 3 will be described below with reference to FIG. 5. FIG. 5(b) is a side view of the panel holder 3 shown in FIG. 5(a), which is taken from the F direction in the figure.

As shown in FIG. 5(a), the panel holder 3 is configured to include the side plates 31, flat springs 32, and a pin 33 and is rotatably supported on the equipment chassis 1 through the support axis of the gear 12g.

The side plates 31 are provided on both sides of the panel holder 3, respectively, as shown in FIG. 5(a) to connect the panel holder 3 and the equipment chassis 1. The flat springs 32 are attached to the inner walls of the side plates 31.

As shown in FIG. 5(c) each flat spring 32 is an approximately planar spring with a bent edge and the opposite edge is fixed to one of the side plates 31. The bent edge is formed in a shape such that it can be fitted into a groove provided in the side of the operation panel 2 as described later. In the flat spring 32, the bent edge is biased inwardly (in the direction of contact with the operation panel 12) by a predetermined elastic force with the edge fixed to the side plate 31 being a fulcrum.

More specifically, when the operation panel 2 is attached to the panel holder 3, the bent edge of the flat spring 32 is fitted into the groove in the side of the operation panel 2 to hold the operation panel 2 with the predetermined elastic force. Then, the operation panel 2 can move along the groove in the side of the operation panel 2.

Figure 5:
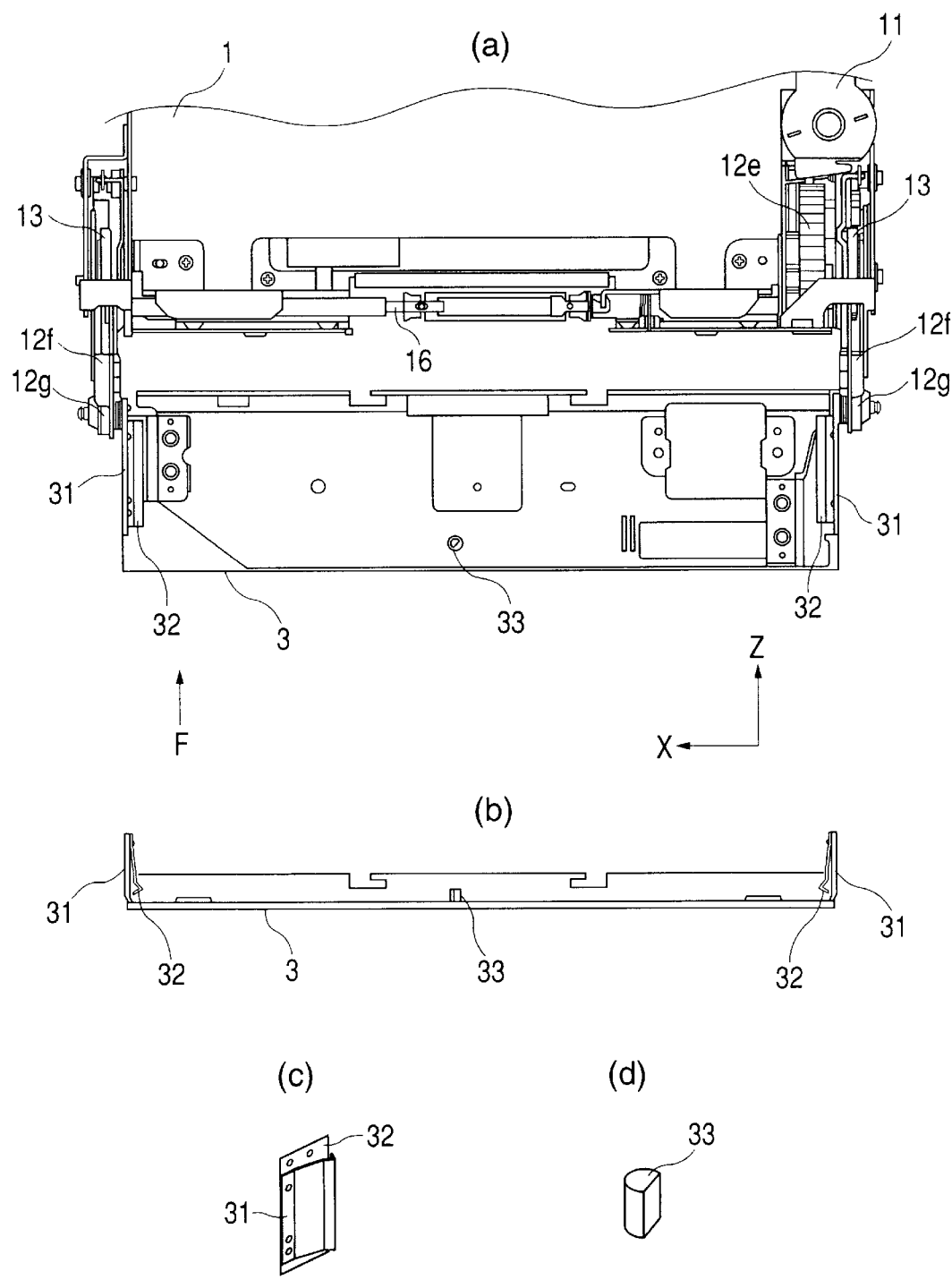
FIG. 5(a) is a sectional view of an equipment chassis for explaining the arrangement of the drive mechanism.
FIG. 5(b) is a side view of the panel holder.
FIG. 5(c) is a perspective view for showing a flat spring.
FIG. 5(d) is a perspective view for showing a pin.

The pin 33 is formed in a shape obtained by cutting a cylinder in a vertical direction as shown in FIG. 5 and is buried at a location where it is to engaged with a retainer of the slide key 23 provided on the back face of the operation panel 2 described later. More specifically, when the operation panel 2 is attached to the panel holder 3, the pin 33 is engaged with the retainer of the slide key 23 on the operation panel 2 to inhibit the operation panel 2 from moving along the groove in the side.

Figure 6:
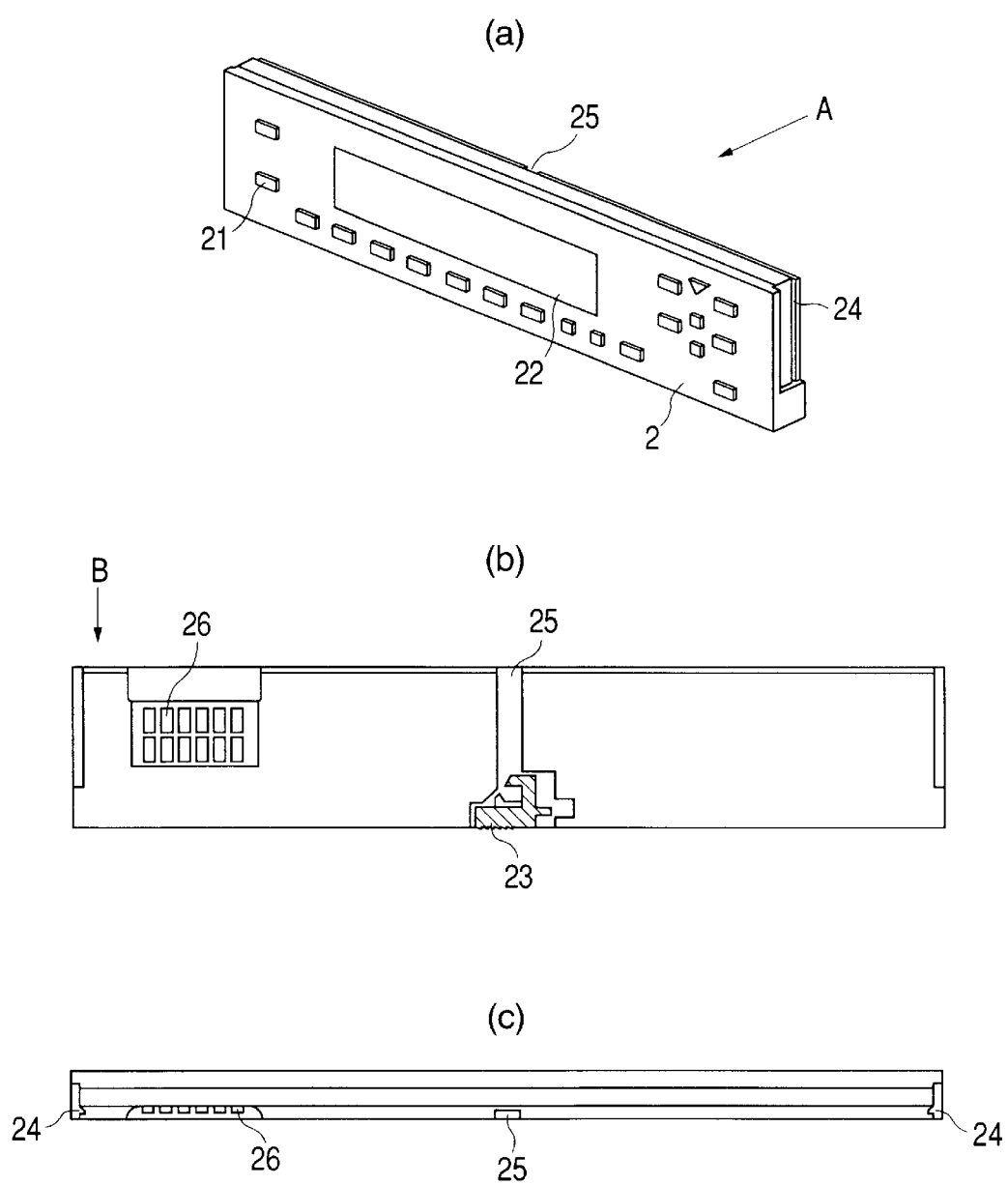
FIG. 6(a) is a perspective view for showing the appearance of the operation panel and FIGS. 6(b) and 6(c) are its plan views.

Next, the operation panel 2 will be described below with reference to FIG. 6. FIG. 6(a) is a perspective view for showing the appearance of the operation panel 2. FIG. 6(b) is a plan view of the operation panel 2 shown in FIG. 6(a), which is taken from the A direction (back-face direction) in the figure. FIG. 6(c) is another plan view of the operation panel 2 shown in FIG. 6(a), which is taken from the B direction in the figure.

As shown in FIG. 6(a), the operation panel 2 is configured to include a plurality of operational keys 21, the display unit 22, the slide key 23, a side groove 24, a central groove 25, and a terminal section 26.

Each of the operational keys 21 is composed of a push-button switch of a predetermined shape. The operational keys 21 include an eject key to instruct the rotation of the operation panel 2. The display unit 22 is composed of a fluorescent character display tube. The terminal section 26 is composed of a predetermined connector terminal.

The side groove 24 is provided so that the flat spring 32 of the panel holder 3 is fitted thereinto as described above. More specifically, the side groove 24 is provided to fittingly receive the bent edge of the flat spring 32. Thus, the operation panel 2 is held by the panel holder 3 by fitting the flat spring 32 into the side groove 24. Then, the operation panel 2 can move along the side groove 24.

The central groove 25 is provided at a predetermined location on the back face of the operation panel 2 as shown in FIG. 6(b). The depth of the central groove 25 is equal to or larger than the height of the pin 33 on the panel holder 3 described above. Within the central groove 25, the slide key 23 is buried so that it can slide in a predetermined direction.

Figure 7:
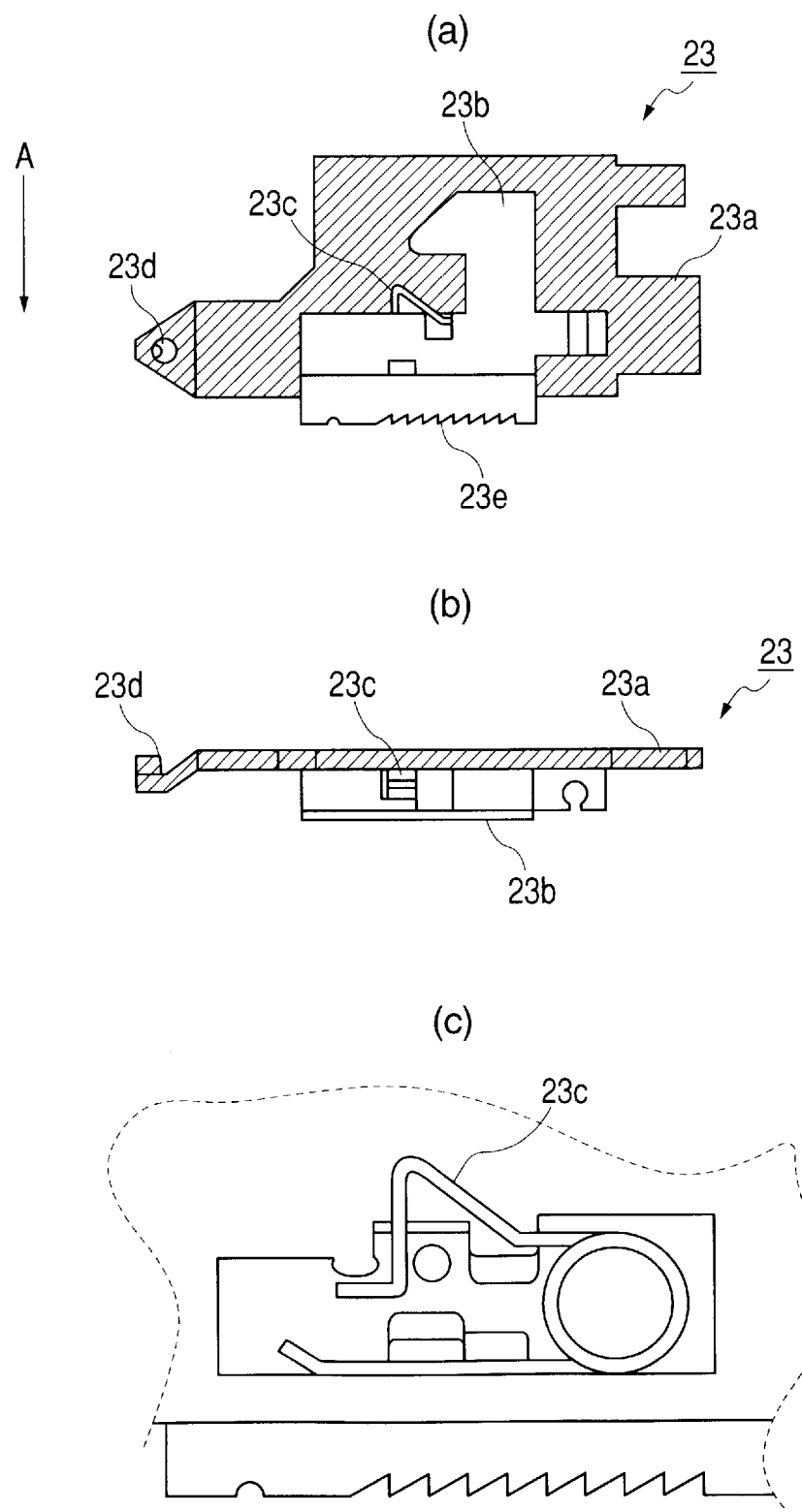
FIG. 7(a) is a front view of a slide key.
FIG. 7(b) is a side view of the slide key.
FIG. 7(c) is a sectional view for showing a coil spring housed in the slide key.

Now, the slide key 23 will be described below with reference to FIG. 7. FIG. 7(a) is a perspective view for showing the appearance of the slide key 23. FIG. 7(b) is a side view of the slide key 23 shown in FIG. 7(a), which is taken from the A direction in the figure.

As shown in FIG. 7(a), the slide key 23 is composed of a base section 23a, a body section 23b, and a coil spring 23c. The base section 23a and the body section 23b are formed integral with each other.

The base section 23a is an approximately planar plate with a hole 23d at one end and is partly buried into the operation panel 2 (central groove 25). One end of a predetermined spring is fixed to the hole 23d.

The body section 23b is integrally formed on the base section 23a to provide an approximately U-shaped retainer in which the coil spring 23c is to be housed. In addition, a plurality of grooves 23e are formed in the side of the body section 23b. The grooves 23e function as slip resistance when the user slides the slide key 23.

The coil spring 23c is a spring with a protrusion as shown in FIG. 7(c) and is buried in the body section 23b so that the protrusion protrudes from the body section 23b. The coil spring 23c exerts a predetermined elastic force outwardly. Then, the protrusion will be in contact with the approximately U-shaped retainer of the body section 23b.

Figure 8:
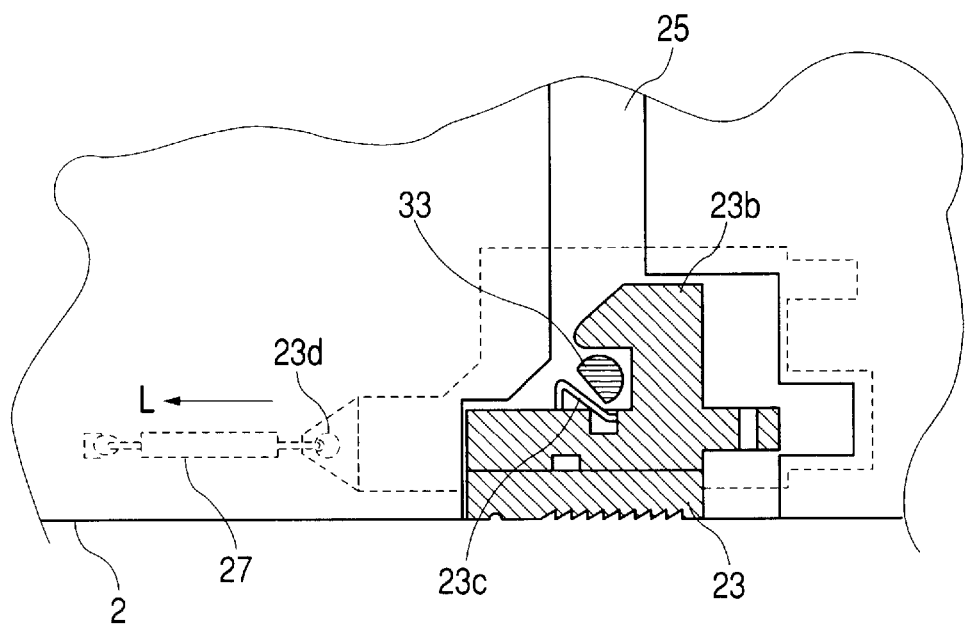
FIG. 8(a) is a schematic drawing for explaining a pin locked by the slide key and FIG. 8(b) is a schematic drawing for explaining the release of the pin locked by the slide key.
Figure 8:
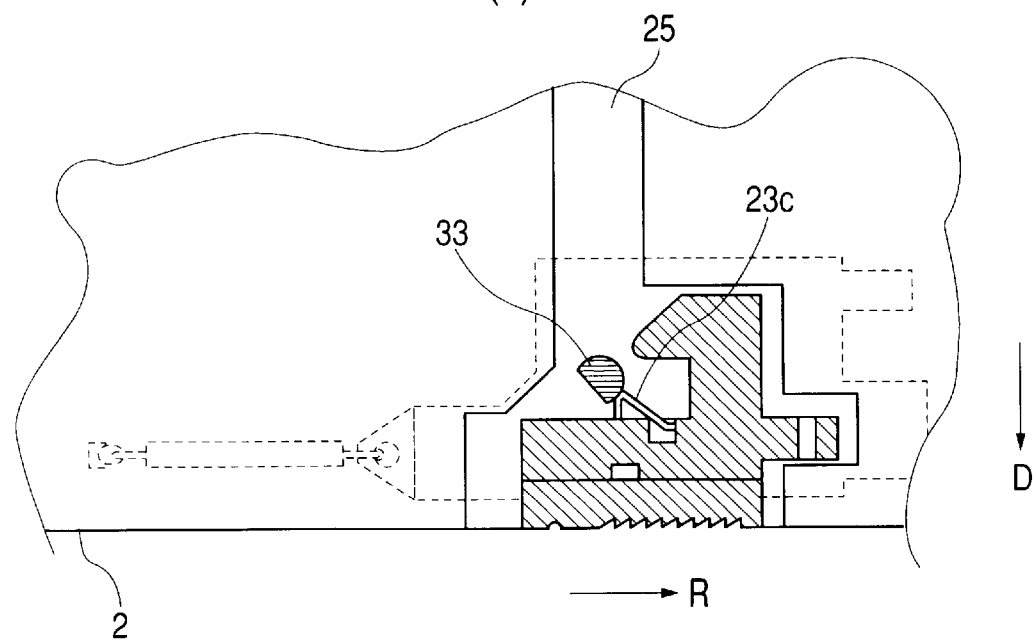

The slide key 23 described above holds the pin 33 of the panel holder 3 within the retainer while the operation panel 2 is attached to the panel holder 3. More specifically, as shown in FIG. 8(a), the slide key 23 holds the pin 33 within the approximately U-shaped retainer of the body section 23b. Then, a spring 27 fixed to the hole 23d pulls the slide key 23 in the L direction in the figure and the coil spring 23c locks the pin 33, so that the operation panel 2 can be held by the panel holder 3 without creeping.

As shown in FIG. 8(b), when the slide key 23 is slided by the user in the R direction in the figure, the coil spring 23c is pushed by the pin 33 to sink into the body section 23b, thereby releasing the lock. Thereafter, when the operation panel 2 is moved by the user in the D direction in the figure, the pin 33 passes through the central groove 25, so that the operation panel 2 can be removed from the panel holder 3.

Figure 9:
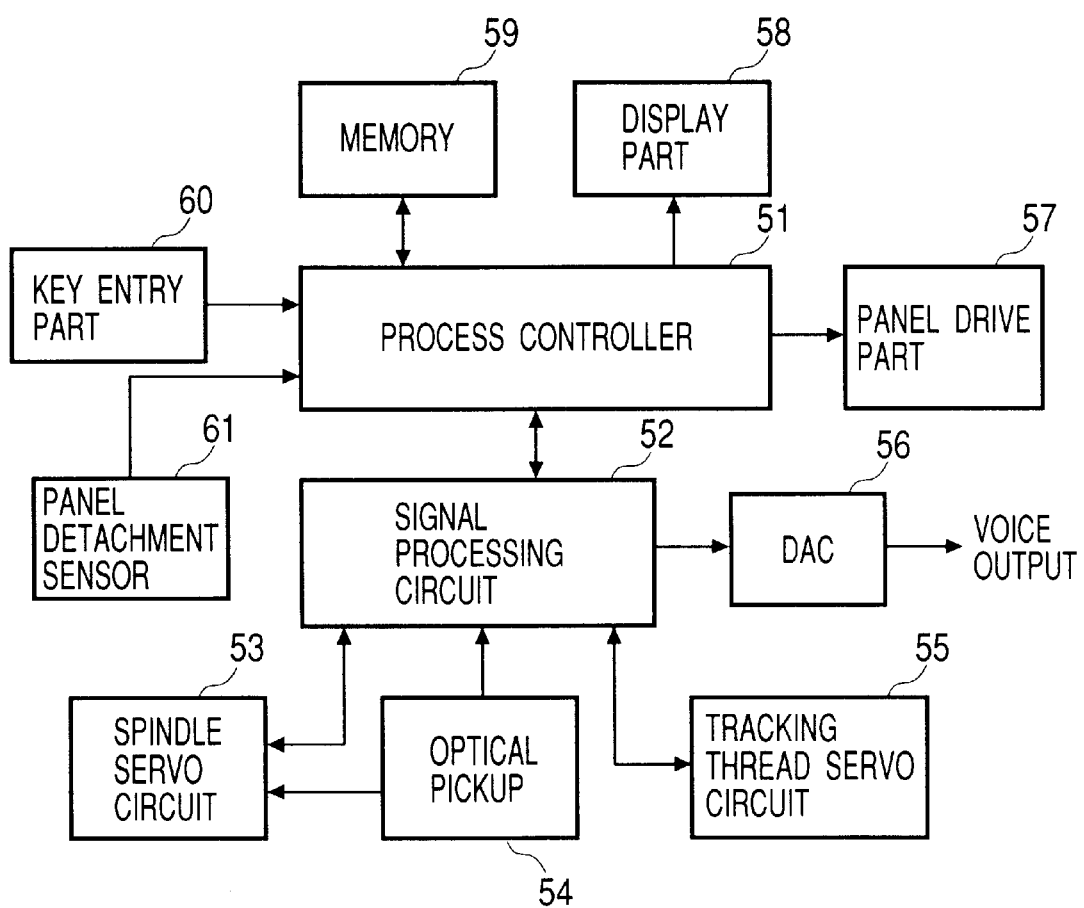
FIG. 9 is a block diagram for explaining the configuration of an electronic equipment for vehicle use according to an embodiment of the present invention, excluding its mechanical configuration.

Now, the configuration of the electronic equipment for vehicle will be described below with reference to FIG. 9, excluding the mechanical configuration described above. FIG. 9 is a block diagram for explaining that configuration of the electronic equipment for vehicle use.

As shown in FIG. 9, the electronic equipment for vehicle use is configured to include a process controller 51, a signal processing circuit 52, a spindle servo circuit 53, an optical pickup 54, a tracking thread servo circuit 55, a DAC 56, a panel drive part 57, a display part 58, a memory 59, a key entry part 60, and a panel detachment sensor 61.

The process controller 51 is composed of a one-chip microcomputer which includes a Central Processing Unit (CPU) and peripheral Large Scale Integrated (LSI) circuits to control the entire electronic equipment for vehicle use. In other words, the process controller 51 controls the panel drive part 57 to perform panel rotation processes described later. The process controller 51 also controls the signal processing circuit 52 to read out music data recorded on a CD for playback.

The signal processing circuit 52 controls the spindle servo circuit 53, the optical pickup 54, and the tracking thread servo circuit 55. Thus, it reads out music data stored on a CD through the optical pickup 54. The signal processing circuit 52 decodes the read-out music data and then supplies the decoded music data to the DAC 56.

The spindle servo circuit 53 drives a spindle motor (not shown) to rotate a predetermined turntable on which a CD is mounted, so that the turntable is rotated at a predetermined rotation speed.

The optical pickup 54 irradiates pits formed on the recording side of a CD with a laser beam of a predetermined wavelength to convert any reflected light into electrical signals. Then, the optical pickup 54 supplies the converted electrical signals to the signal processing circuit 52 as music data.

The tracking thread servo circuit 55 drives a thread motor (not shown) to move the optical pickup 54 horizontally in the direction of the CD diameter, so that the optical pickup 54 is moved to a predetermined location on the recording side of the CD.

The DAC (digital/analog converter) 56 converts digital music data supplied by the signal processing circuit 52 to analog music signals and then provides the converted music signals as output music signals through a predetermined amplifier and speaker.

The panel drive part 57 is composed of a driver circuit to drive the motor 11 included in the drive mechanism for the equipment chassis 1 described below.

The display part 58 is composed of the display unit 22 of the operation panel 2 described below and a control circuit therefor and it is controlled by the process controller 51 to display character strings for explicitly presenting operation conditions to the user.

The memory 59 is composed of a Random Access Memory (RAM) to store predetermined information used for a panel rotation process.

When any one of the operational keys 21 on the operation panel 2 described above is pressed down, the key entry part 60 generates a corresponding signal and supplies it to the process controller 51. For example, when the eject key included in the operational keys 21 is pressed down, the key entry part 60 supplies to the process controller 51 a signal indicating that the eject key is pressed down.

The panel detachment sensor 61 is composed of a predetermined contact sensor to supply a predetermined signal to the process controller 51 when the operation panel 2 is removed from the panel holder 3 or when the operation panel 2 is attached to the panel holder 3.

Figure 10:
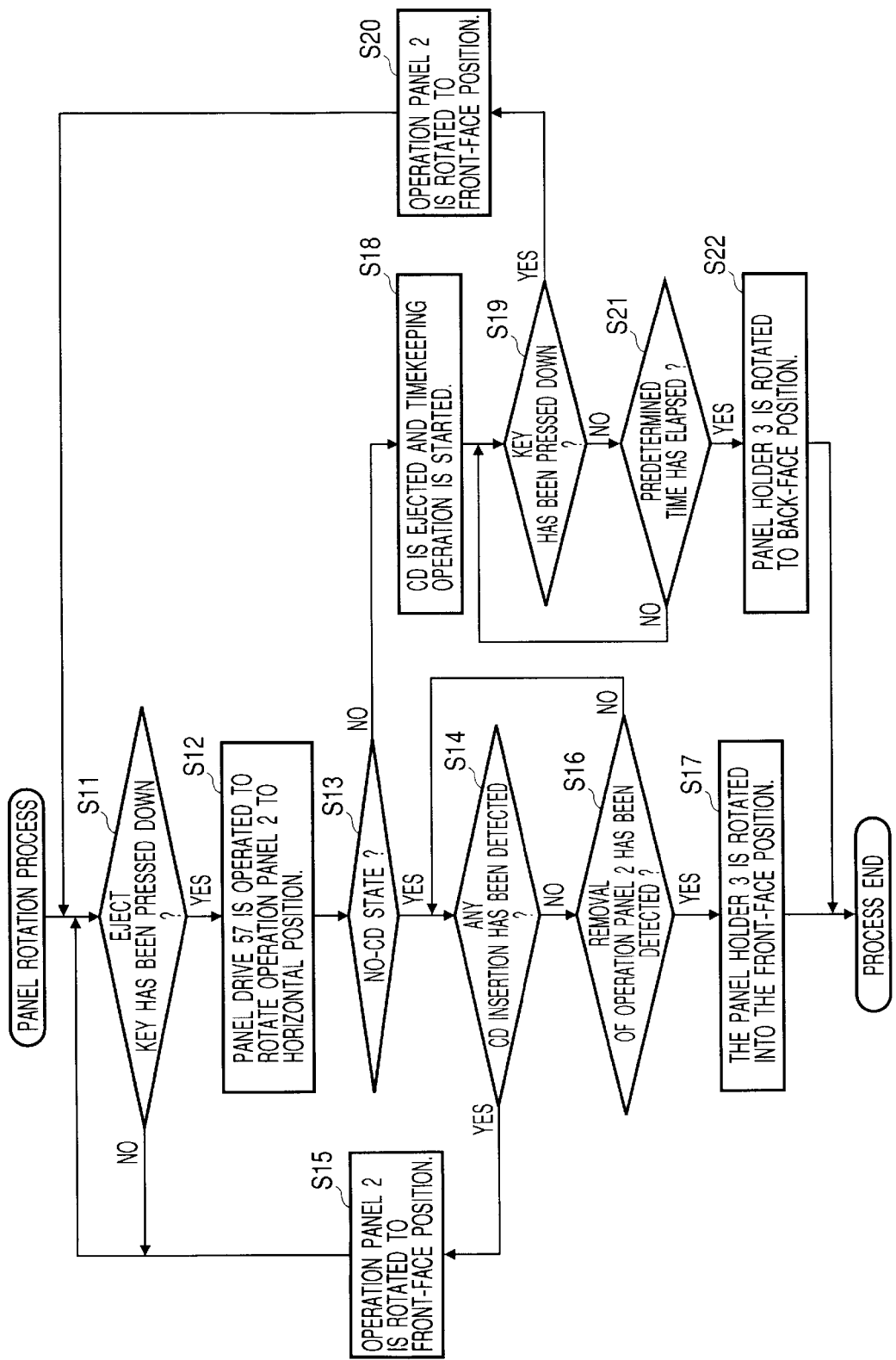
FIG. 10 is a flow chart for explaining a panel rotation process according to an embodiment of the present invention.

Now, the panel rotation process performed by the above-mentioned process controller 51 in the electronic equipment for vehicle use will be described below with reference to FIG. 10. FIG. 10 is a flow chart for explaining the panel rotation process. The panel rotation process is performed while the operation panel 2 is attached to the panel holder 3 and the operation panel 2 is in the front-face position.

First, the process controller 51 waits until the eject key included in the operational keys 21 is pressed down (step S11). More specifically, the process controller 51 waits until the user enters an instruction to rotate the operation panel 2 which is currently in the front-face position.

Figure 11:
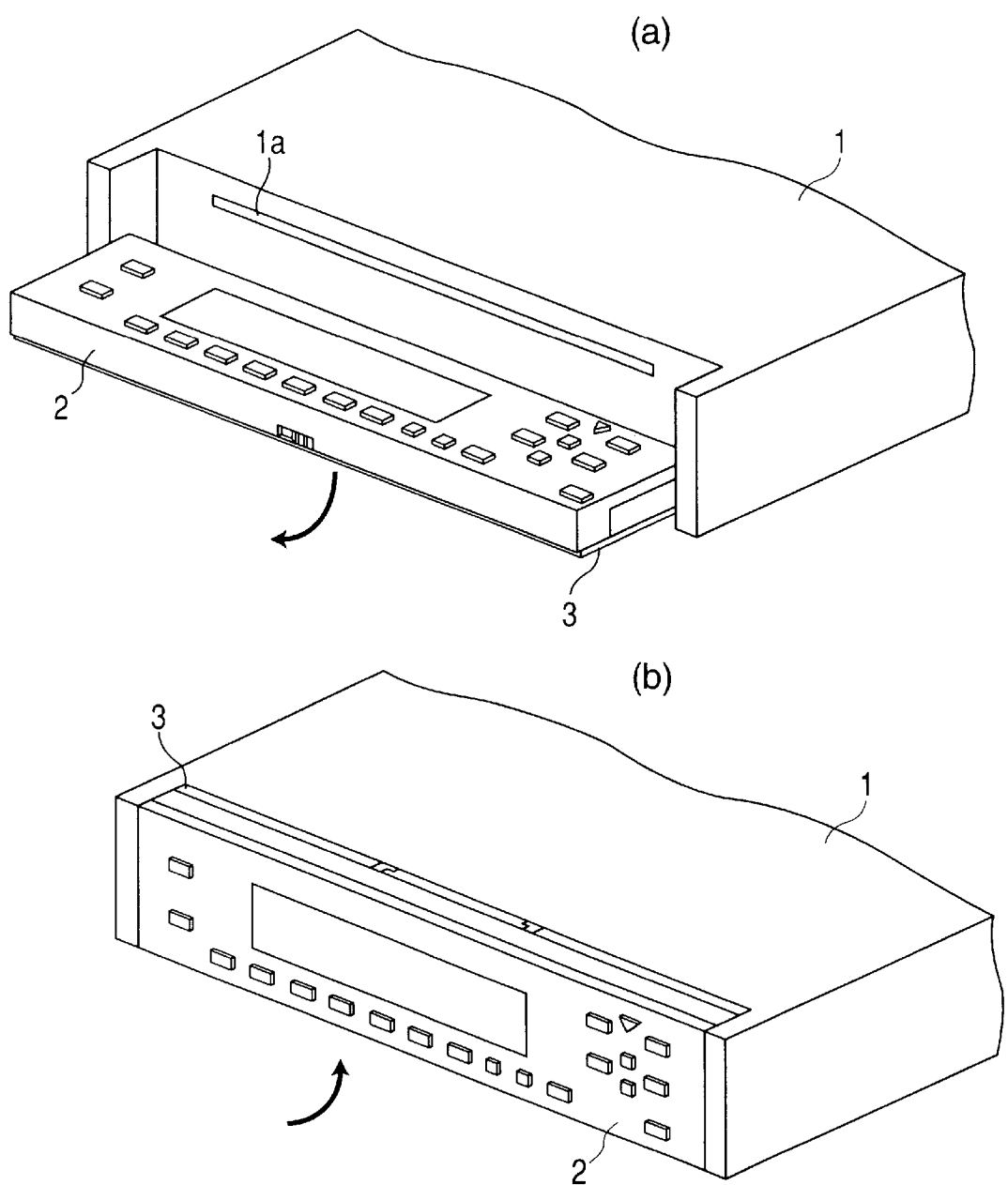
FIG. 11(a) is a schematic drawing for explaining how the operation panel is rotated into the horizontal position and FIG. 11(b) is a schematic drawing for explaining how the operation panel is rotated into the front-face position.

When the process controller 51 determines that the eject key has been pressed down, it operates the panel drive part 57 to rotate the operation panel 2 into the horizontal position (step S12). More specifically, the process controller 51 operates the panel drive part 57 to drive the motor 11 so that the panel holder 3 is rotated until the operation panel 2 held by the panel holder 3 is in the horizontal position as shown FIG. 11(a).

The process controller 51 determines whether the equipment is in no-CD state (step S13). In other words, the process controller 51 determines whether any CD has been housed in the equipment.

When the process controller 51 determines that no CD has been housed, it then determines whether any CD insertion has been detected (step S14). In other words, the process controller 51 determines whether any CD has been inserted by the user through an opening 1 a shown in FIG. 11(a).

When the process controller 51 determines that a CD insertion has been detected, the inserted CD is loaded onto a predetermined turntable and then the operation panel 2 is rotated into the front-face position (step S15). More specifically, the process controller 51 rotates the panel holder 3 until the operation panel 2 held by the panel holder 3 is in the front-face position as shown FIG. 11(*b*). When the operation panel 2 is kept in the front-face position, the process controller 51 returns the process to step S11 described above.

When no CD insertion is detected at step S14, the process controller 51 then determines whether the removal of the operation panel 2 has been detected (step S16). More specifically, the process controller 51 determines whether a signal indicating the removal of the operation panel 2 has been received from the panel detachment sensor 61.

When the process controller 51 determines that the removal of the operation panel 2 has not been detected, it returns the process to step S14 and repeats steps S14 to S16 described above.

Figure 12:
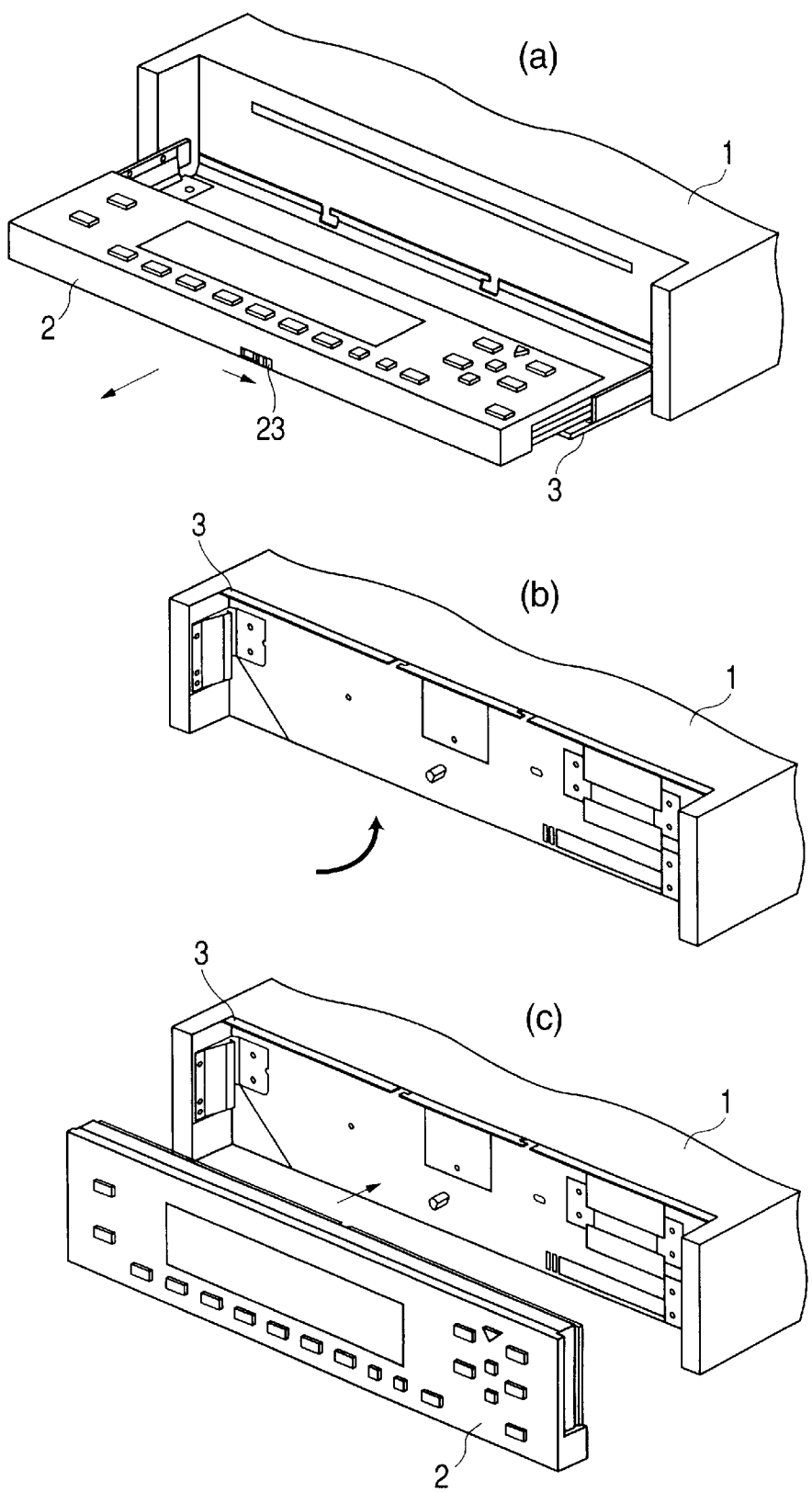
FIG. 12(a) is a schematic drawing for explaining how the operation panel is removed from the panel holder.
FIG. 12(b) is a schematic drawing for explaining how the panel holder is rotated into the front-face position.
FIG. 12(c) is a schematic drawing for explaining how the operation panel is attached to the panel holder.

On the other hand, when the removal of the operation panel 2 has been detected, the process controller 51 rotates the panel holder 3 into the front-face position (step S17). More specifically, when the user slides the slide key 23 to remove the operation panel 2 from the panel holder 3 as shown in FIG. 12(*a*), the panel detachment sensor 61 detects the removal of the operation panel 2. The process controller 51 which has detected the removal operates the panel drive part 57 so that the panel holder 3 from which the operation panel 2 has been removed is rotated into the front-face position as shown in FIG. 12(*b*).

Then, the equipment is made unavailable and incomplete. Thus, the electronic equipment for vehicle use can be protected from theft effectively.

The removed operation panel 2 can be attached again from the front of the panel holder 3 as shown in FIG. 12(*c*). More specifically, the flat spring 32 of the panel holder 3 is fitted into the side groove 24 in the operation panel 2 or the pin 33 of the panel holder 3 is engaged with the retainer of the slide key 23 so that the operation panel 2 is held within the panel holder 3.

When the process controller 51 determines at step S13 that the equipment is not in no-CD state (any CD has been housed in the equipment), it ejects the housed CD and starts a timekeeping operation (step S18). More specifically, after the CD has been ejected, the process controller 51 starts keeping a predetermined time required to rotate the operation panel 2 into the back-face position.

Concurrently with the timekeeping operation, the process controller 51 determines whether a predetermined key has been pressed down (step S19). In other words, the process controller 51 determines whether the user has entered a predetermined instruction.

When the process controller 51 determines that the predetermined key has been pressed down, it stops the timekeeping operation and then rotates the operation panel 2 into the front-face position (step S20). When the operation panel 2 is rotated into the front-face position, the process controller 51 returns the process to step S11 described above.

When the process controller 51 determines at step S19 that the predetermined key has not been pressed down, it determines whether the predetermined time has elapsed (step S21). In other words, the process controller 51 determines whether the predetermined time required to rotate the operation panel 2 into the back-face position has elapsed.

When the process controller 51 determines that the predetermined time has not elapsed, it returns the process to step S19 and repeats steps S19 to S21 described above.

On the other hand, when the process controller 51 determines that the predetermined time has elapsed, it rotates the panel holder 3 into the back-face position (step S22). More specifically, the process controller 51 operates the panel drive part 57 to rotate the panel holder 3 into the back-face position so that the operation panel 2 is hidden as shown in FIG. 13.

Since the operation panel 2 is hidden, thieves can hardly find the equipment for vehicle use itself and thus, the equipment can be protected from theft effectively.

Figure 13:
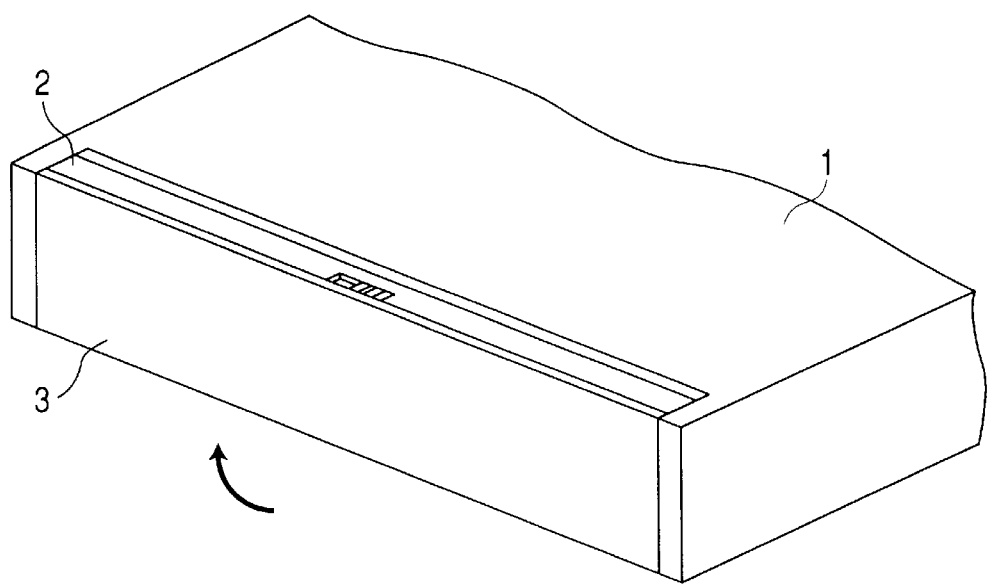
FIG. 13 is a schematic drawing for explaining how the panel holder holding the operation panel is rotated into the back-face position.
Figure 14:
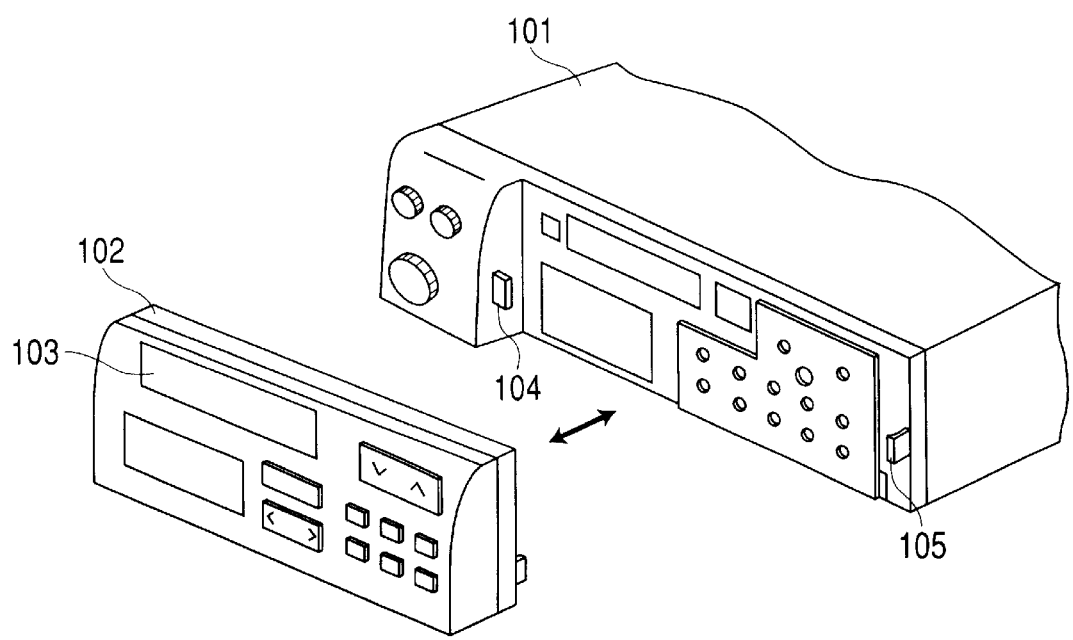
FIG. 14 is an outline drawing for showing an example of a prior panel-detachable electronic equipment for vehicle use.
Figure 15:
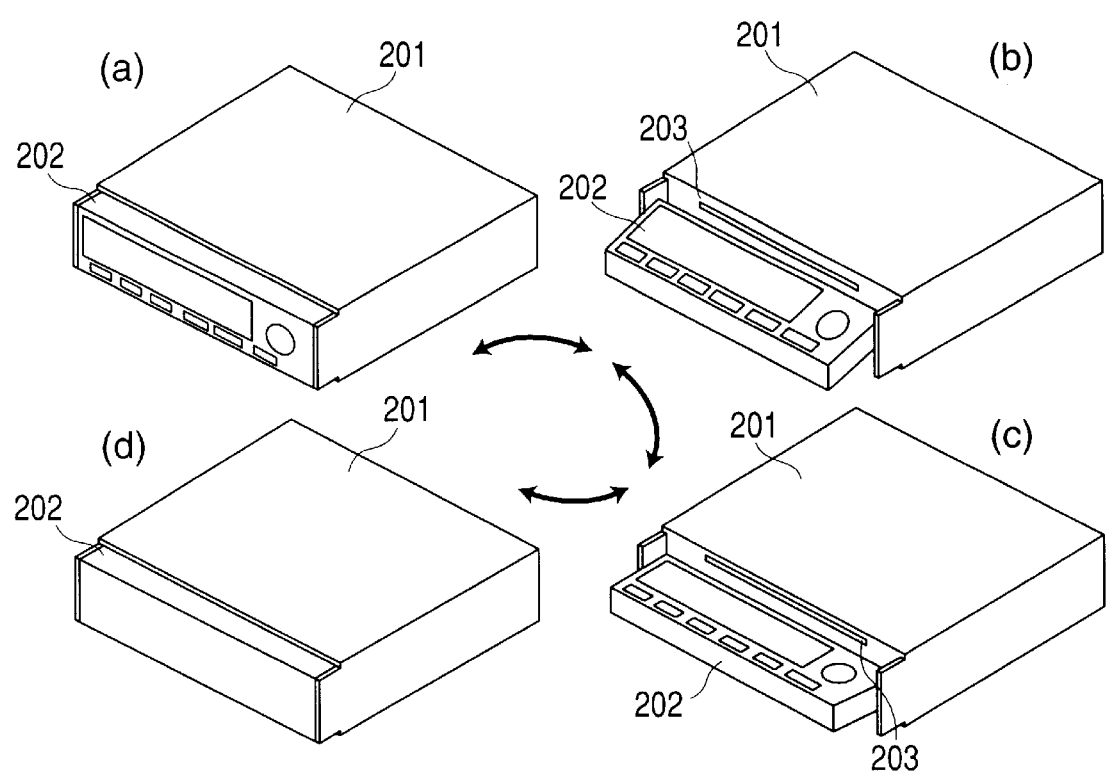
FIG. 15 is an outline drawing for showing an example of a prior maskable electronic equipment for vehicle use.

In the back-face position as shown in FIG. 13, when a predetermined hidden key is pressed down by the user, the process controller 51 operates the panel drive part 57 again to rotate the operation panel 2 into the front-face position.

In this way, the above-mentioned electronic equipment for vehicle use can be protected from theft effectively, since it functions as a panel-detachable equipment when the user chooses to remove the operation panel 2 and as a maskable equipment when the user chooses to rotate the operation panel 2. Therefore, it can be properly protected from theft depending on the user situation, while compensating for possible disadvantages of the panel-detachable equipment of the maskable equipment.

Since the operation panel 2 is properly held by the panel holder 3 by fitting the flat spring 32 into the side groove 24 and by engaging the pin 33 with the slide key 23, the electronic equipment for vehicle use can avoid the operation panel from moving (inclining) due to vibrations when a vehicle with the equipment runs on a bumpy street.

Although, in the panel rotation process according to the above-mentioned embodiment, the panel holder 3 is rotated into the back-face position after a predetermined time has elapsed, the panel holder 3 may be rotated into the back-face position in response to a predetermined key entry.

Although the mechanism for removing the operation panel 2 along the central groove 25 (such as the slide key 23 and the pin 33) with the panel holder 3 rotated into the horizontal position has been described above according to the above-mentioned embodiment, the operation panel 2 may be removed in any position. For example, a mechanism which allows for removal of the operation panel 2 in the front-face position may be used to remove the operation panel 2 without rotating the panel holder 3.

Although the electronic equipment for vehicle use according to the above-mentioned embodiment can play back CDs, the present invention is not limited to this embodiment and is applicable to another type of electronic equipment for vehicle use which can handle not only CDs but also mini disks (MDs), Magneto-Optical disks (MOs), and digital video disk random access memories (DVD-RAMs) for playback. In addition, it may be applicable to still another type of electronic equipment which can handle SmartMedias™M, MemorySticks™, and other media.

Although the drive mechanism according to the above-mentioned embodiment is composed of the gears 12*a* to 12*g* and the arm plate 13, the drive mechanism may have any other configuration.

INDUSTRIAL APPLICABILITY

As described above, the equipment according to the present invention can be protected from theft properly and effectively.

What is claimed is:

1. An electronic equipment for vehicle use, the front face of which is provided with an operation panel, said operation panel being rotatable to a first state where the operation side of said operation panel confronts a user and to a second state where the back face of said operation side confronts the user, said electronic equipment comprising:

a holder for detachably holding said operation panel;

a drive mechanism for rotatably driving said holder to said first state and said second state;

an engagement mechanism for engagingly supporting said holder and said operation panel; and a release key for releasing the engagement made by the engagement mechanism;

wherein said equipment has a sensor for detecting that said operation panel is removed from said holder; and wherein said holder is rotated to a predetermined position in response to the detection of the fact that said operation panel is removed.

2. The electronic equipment for vehicle use according to claim 1, wherein said operation panel can be removed in a particular position other than said first and second states and, after the removal is detected, said holder is rotated to said first position.

3. The electronic equipment for vehicle use according to any one of claims 1 or 2, wherein when said operation panel is removed from said holder, said operation panel can be attached again while said holder is in said first position.

4. The electronic equipment for vehicle use according to claim 1, wherein said engagement mechanism has such an engaging structure that a first engagement member provided for said operation panel and a second engagement member provided for said holder are forced with springs to fit said operation panel into a predetermined position in said holder, such that said holder and said operation panel can be removed from said predetermined position in said holder through said release key.

5. The electronic equipment for vehicle use according to claim 4, wherein said release key is provided on said operation panel.

6. The electronic equipment for vehicle use according to claim 4, wherein said engaging structure is made such a way that said operation panel is engaged with said holder by being pressed against said predetermined position in said holder in the direction perpendicular to the operation side for engagement.

7. The electronic equipment for vehicle use according to claim 4, wherein said engaging structure is made such a way that said operation panel is engagingly supported by said holder while it is kept slidable in the direction parallel to the operation side.

8. The electronic equipment for vehicle use according to claim 7, wherein said engaging structure consists of a first engaging structure for regulating the relative movement between said operation panel and said holder at a first part and a second engaging structure for regulating said relative movement at a second part other than said first part so that the engagement can be released with said release key.

9. In an electronic equipment for vehicle, the front face of which is provided with an operation panel, said operation panel being rotatable to a first state where the operation side of said operation panel confronts a user and to a second state where the back face of said operation side confronts the user, a method for controlling a drive mechanism which drives a holder for detachably holding said operation panel so as to rotate to said first state and said second state, said method comprising the steps of:

operating said drive mechanism to rotate said holder to a predetermined position where said operation panel can be removed;

detecting that said operation panel is removed from said holder; and driving said holder to said first state in response to the detection.

10. The panel rotation control method according to claim 9, further comprising:

a step of driving said holder to said second state when the removal is not detected.

* * * * *